United States Patent [19]

Gandhi et al.

[11] Patent Number: 4,916,898
[45] Date of Patent: Apr. 17, 1990

[54] METHOD FOR TREATMENT OF EXHAUST GASES

[75] Inventors: Haren S. Gandhi, Farmington Hills; Joseph T. Kummer, Ypsilanti, both of Mich.

[73] Assignee: Ford Motor Company, Dearborn, Mich.

[21] Appl. No.: 715,691

[22] Filed: Mar. 25, 1985

[51] Int. Cl.$^4$ .................................................. F01N 3/20
[52] U.S. Cl. .......................................... 60/274; 60/306
[58] Field of Search ............................ 60/274, 306, 305

[56] References Cited

U.S. PATENT DOCUMENTS

| | | | |
|---|---|---|---|
| 3,086,353 | 4/1963 | Ridgway | 60/290 |
| 3,662,541 | 5/1972 | Sawada | 60/305 |
| 3,826,089 | 7/1974 | Nakajima | 60/290 |

Primary Examiner—Douglas Hart
Attorney, Agent, or Firm—Joseph W. Mallech

[57] ABSTRACT

This specification teaches a method for treatment of exhaust gases which if left untreated can generate, upon full oxidation, temperatures in a range of from about 1600° F. to about 2700° F. over an oxidizing catalyst. The method has the following steps. An internal combustion engine (10) is operated under conditions in which there is insufficient oxygen to oxide all the hydrocarbon present in the fuel. The exhaust gases so-developed are passed into an exhaust manifold (12) and then through an exhaust pipe (14) to an oxidation catalyst (16) whose primary oxidation catalyst is palladium. An air pump (20) generates a supply of oxygen which can supply up to about 80% of the oxygen required to combust fully all of the hydrocarbons and carbon monoxide contained in the exhaust gases when the internal combustion engine is operating in a wide-open throttle condition. A portion of the generated oxygen supply is directed by means of an air line (24) into the exhaust manifold where the oxygen oxidizes any of the hydrocarbons and oxidizes a portion of the carbon monoxide. A remaining portion of the generated oxygen supply is directed by an air line (26) into the exhaust gases in the exhaust pipe just prior to passing over the oxidation catalyst. When the internal combustion engine is operated at wide-open throttle conditions, all but a small amount of the carbon monoxide in the exhaust gases is fully oxidized and all of the oxides of nitrogen are reduced to nitrogen at a time when the internal combustion engine is producing a very large amount of oxides of nitrogen.

4 Claims, 1 Drawing Sheet

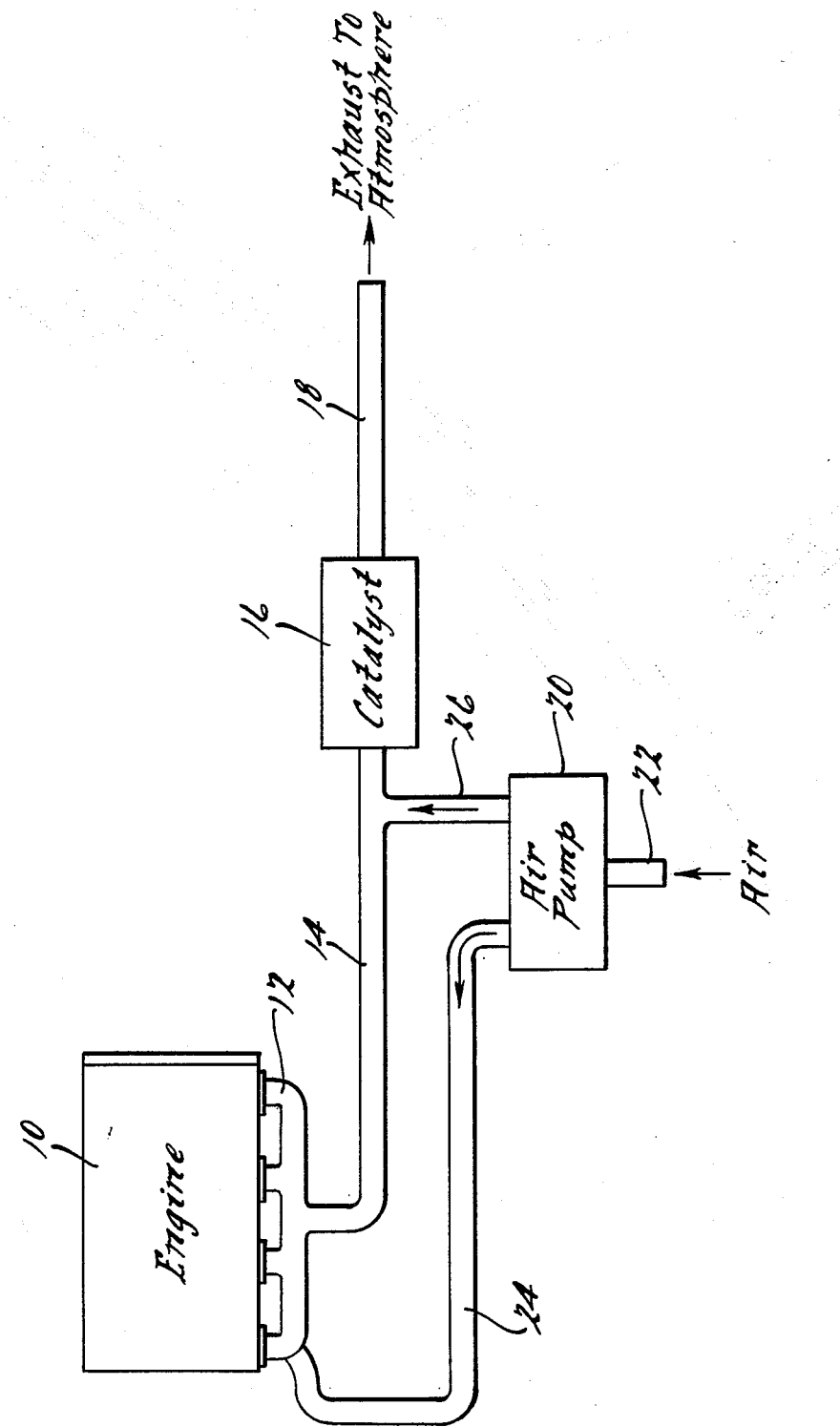

METHOD FOR TREATMENT OF EXHAUST GASES

TECHNICAL FIELD

This application is directed to a method for treatment of exhaust gases which, if left untreated, can generate, upon full oxidation, temperatures in a range of 1600–2700° F. over an oxidizing catalyst. This method has particular utility in exhaust gas treatment systems used for gasoline engine powered, medium weight, heavy duty trucks (8,500–14,000 pounds gross vehicle weight). The method provides a very simplified emission control system to provide catalytic control of carbon monoxide, unburned hydrocarbons and oxides of nitrogen

BACKGROUND AND PRIOR ART STATEMENT

It is proposed in the United States that certain sizes of trucks be required to comply with emission standards. For example, there are proposals that model year 1987, medium weight, heavy duty trucks be required to meet an emission standard Medium weight, heavy duty trucks are trucks which have a gross vehicle weight in a range of 8,500–14,000 pounds. Such trucks normally operate on interstate highways, carrying goods between distant cities. This size truck is usually equipped with an internal combustion engine, burning a hydrocarbon fuel such as gasoline. These vehicles operate at normal throttle conditions during a substantial portion of their cycle but, in many instances, these vehicles are required to advance to a wide-open throttle condition, obtaining maximum output from the internal combustion engine. Such wide-open throttle excursions are encountered during acceleration of the truck to highway operating speeds and accelerations caused for passing other vehicles.

When such medium weight, heavy duty trucks are operated at wide-open throttle conditions, the engines are generally operating at an air/fuel ratio in a range of 12–13 during maximum load conditions. In such an operating air/fuel ratio, an engine of this type will produce an exhaust gas mixture which is very hot, approximately 1600° F. The exhaust gases so-produced are also rich in oxides of nitrogen because of the range of air/fuel ratios, and will contain approximately 5–6 mole percent of carbon monoxide. It is known that a complete oxidation of every mole percent carbon monoxide produces about 180° F. rise in temperature. Therefore, if exhaust gases containing 6 mole percent carbon monoxide are oxidized by passing them over an oxidation catalyst alone, the maximum exhaust gas temperature that could be generated on the exhaust gas catalyst could approach a temperature of 2600–2700° F., assuming no loss of heat. Such an extremely high temperature, of course, is detrimental to the catalyst materials and catalyst substrates. It would not take long for a vehicle having a catalyst operating at such a high temperature to deteriorate severely and deactivate the catalyst system.

The primary purpose of our invention is to provide a method of operating a catalyst system for a medium weight, heavy duty truck which provides excellent control for carbon monoxide, unburned hydrocarbons and oxides of nitrogen, but yet does not produce undesirably high temperatures over the oxidation catalyst used in the system. The method of our invention is also one which readily handles the reduction of oxides of nitrogen at wide-open throttle conditions when the maximum amount of such oxides of nitrogen are being generated in the internal combustion engine associated with the medium weight, heavy duty truck. Also, during these maximum load conditions, our method provides for approximately 100% oxidation of unburned hydrocarbons and provides 80–95% oxidation of carbon monoxide. Under partial throttle conditions or normal throttle conditions, almost complete oxidation of carbon monoxide and unburned hydrocarbons is achieved, and the amount of oxides of nitrogen produced is very reduced because the engine is running under less than full load conditions, whereat the oxides of nitrogen generated by the burning process in the engine is substantially reduced in and of itself.

A search was carried out on the subject matter of this specification in the U.S. Patent and Trademark Office. As a result of this search, a number of U.S. patents were cited. In our opinion, none of the patents either disclosed or suggested the system which is to be disclosed and claimed herein. However, a brief review of these patents is set forth below for the purpose of setting the state of the art.

U.S. Pat. No. 3,045,422, issued on July 24, 1962, for "Temperature Control of a Catalytic Exhaust Purifier." This patent shows air delivery upstream of a catalyst, controlled in a manner so as to keep the catalyst temperature within its operating range. The control is also carried out so that the air/exhaust gas weight ratio decreases as the engine speed increases.

U.S. Pat. No. 3,086,353, issued on Apr. 23, 1963, for "Afterburner Systems." This patent shows a system in which fresh air supplied to an afterburner is controlled to limit the temperature to which the afterburner may rise. Control of the temperature is based upon measurements of the afterburner temperature.

U.S. Pat. No. 3,826,089, issued on July 30, 1974, for "Air-Pollution Preventive Arrangement." This patent teaches a system in which the proportion of air supplied to an thermal reactor and a catalytic converter is regulated in accordance with the air/fuel ratio to secure a high recombustion efficiency throughout varying engine operating modes.

U.S. Pat. No. 3,869,858, issued on Mar. 11, 1975 for "Exhaust Gas Purifying System for Motor Vehicles." In the system shown in this patent, a flow control valve, which is operable in response to a warm-up condition, acceleration condition or other operating condition of the engine, is used to supply secondary air, selectively to either a reduction treatment device or oxidation treatment device which are installed in the exhaust system for treating exhaust gases.

U.S. Pat. No. 3,908,365, issued on Sept. 30, 1975, for "Treatment of Gaseous Effluent." This patent teaches the treatment of effluent arising from incomplete combustion of a hydrocarbon fuel by a process which includes the sequential steps of oxidizing a portion of the total oxidizable components, lowering the oxides of nitrogen content in the effluent by chemical reduction at an elevated temperature, and further oxidizing the remaining oxidizable components in the effluent to an acceptable level.

U.S. Pat. No. 3,919,842, issued on Nov. 18, 1975, for "Controller for Proportional Control of Reducing Converter Air." This patent teaches a controller in an exhaust emission control system for an engine of an automotive vehicle which controls secondary air flow between a region ahead of a reducing converter and a region intermediate the reducing converter and an oxidizing converter. The amount of air introduced ahead of the reducing converter is proportional to engine exhaust flow and is preferably introduced closely adjacent to the exhaust ports of the engine.

U.S. Pat. 3,943,711, issued on Mar. 16, 1976, for "Multi-Stage Air Pump for Supplying Secondary Air to an Exhaust Gas Purification System." This patent discloses a plurality of pump elements for progressively increasing the pressure of air to supply, respectively, air at various pressures into portions in an exhaust gas purifying system requiring secondary air.

U.S. Pat. No. 4,098,078, issued on July 4, 1978, for "Process and Apparatus for After-Burning of Combustible Pollutants from an Internal Combustion Engine." This patent discloses a pump which supplies an air feed to an exhaust manifold and to a catalytic reactor, with an automatic control of the air injection ratio.

U.S. Pat. No. 4,147,030, issued on Apr. 3, 1979, for "Engine Exhaust Gas Purification System." This patent discloses an engine exhaust gas purification system having an exhaust gas reactor mounted on the engine exhaust pipe, a secondary air supply system having a secondary air supply passage connected to the exhaust pipe upstream of the reactor, and an exhaust gas air/fuel ratio detector mounted on the exhaust pipe to detect air/fuel ratio of the exhaust gases in the exhaust pipe. A secondary air supply control valve is provided in the secondary air supply passage and controlled by a valve actuator having a diaphragm to which positive pressure of the secondary air and engine intake vacuum pressure can be applied. The application of the positive and vacuum pressure to the diaphragm is controlled by solenoid valves which are controlled in accordance with the air/fuel detector output voltage which represents the detected exhaust gas air/fuel ratio, whereby the secondary air supply control valve is controlled such that the secondary air is supplied to the engine exhaust gases at a continuously controlled, variable rate.

U.S. Pat. No. 4,299,089, issued on Nov. 10, 1981, for "Secondary Air Control System in an Internal Combustion Engine." This patent teaches a secondary air system which delivers air to an exhaust manifold and upstream of an oxidizing converter. The secondary air system is computer controlled in response to vacuum, intake air temperature and air flow.

U.S. Pat. No. 4,342,194, issued on Aug. 3, 1982, for "Electric Air Controlled Switching Valve." The electrical air controlled switching valve is used for controlling the delivery of secondary air from an engine driven air pump selectively, as a function of both engine operation and the operation of an associated emission control system, to either the exhaust manifold of an engine, preferably at a location closely adjacent the exhaust ports of the engine, during low temperature engine operation, to the atmosphere, as at the dirty side of the air cleaner associated with the induction system of the engine, during low temperature engine deceleration, to a converter in the exhaust system for the engine downstream of the exhaust manifold during normal engine operation, or again to the atmosphere, as at the dirty side of the air cleaner, when the converter temperature exceeds a predetermined temperature.

U.S. Pat. No. 4,358,927, issued on Nov. 16, 1982, for "Pressure Operated Proportional Air Management Valve." The air management valve is one in an exhaust emission control system for an engine of an automotive vehicle. The valve is operated to control, selectively, secondary air flow to the exhaust manifold next adjacent to the exhaust ports of the engine, to the center of a dual bed catalytic converter, and to the atmosphere.

DISCLOSURE OF INVENTION

This invention relates to a method for treatment of exhaust gases. More particularly, this invention relates to a method for treatment of exhaust gases which if left untreated can generate, upon full oxidation, temperatures in a range of from about 1600° F. to about 2700° F. over an oxidizing catalyst In accordance with the teachings of our invention, the method of treatment of exhaust gases is as follows. An internal combustion engine is operated under conditions in which there is insufficient oxygen to oxide all the hydrocarbons present in the fuel being burned. By such a burning operation, there is developed exhaust gases which contain unburned hydrocarbons and carbon monoxide derived from a partial burning of some of the fuel.

The exhaust gases so-developed are passed into an exhaust manifold of the internal combustion engine. Thereafter, the exhaust gases are passed from the exhaust manifold over an oxidation catalyst whose primary oxidation catalyst is palladium.

A supply of oxygen is generated. This supply of oxygen can supply up to about 80% of the oxygen required to combust fully all of the hydrocarbons and carbon monoxide contained in the exhaust gases to carbon dioxide and water vapor when the internal combustion engine is operating in a wide-open throttle condition. At less than wide-open throttle conditions, the supply of oxygen generated is sufficient to oxidize all of the hydrocarbons and carbon monoxide contained in the exhaust gases to carbon dioxide and water vapor.

A portion of the generated oxygen supply is directed into the exhaust gases in the exhaust manifold. At this point, the oxygen of the generated oxygen supply oxidizes any of the hydrocarbons not yet fully oxidized and also oxidizes a portion of the carbon monoxide contained in the exhaust gases.

A remaining portion of the generated oxygen supply is directed into the exhaust gases passing over the oxidation catalyst. When the internal combustion engine is being operated at wide-open throttle conditions, the remaining portion of the generated oxygen is effective to oxidize all but a small amount of the carbon monoxide in the exhaust gases to carbon dioxide, but, because of the overall reducing nature of the gas, all of the oxides of nitrogen passing over the catalyst are reduced to nitrogen at a time when the internal combustion engine is producing a very large amount of oxides of nitrogen, that is, in the wide-open throttle condition. When the internal combustion engine is being operated at or about normal throttle conditions, all of the carbon monoxide in the exhaust gases are fully oxidized by the oxygen from the generated oxygen supply.

BRIEF DESCRIPTION OF THE DRAWING

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawing, which in the FIGURE schematically depicts an internal combustion engine being operated in accordance with the teachings of the method of our invention.

BEST MODE AND INDUSTRIAL APPLICABILITY

The following description is what we consider to be a preferred embodiment of the method for treatment of exhaust gases in accordance with the teachings of our inventive concept. The following description also sets forth what we now contemplate to be the best mode of carrying out the method of our invention. This description is not intended to be a limitation upon the broader principles of this method for treatment of exhaust gases, and while preferred materials and conditions are described in order to form a construction in accordance with the requirements of the laws, it does not mean that other materials cannot be used with this method.

The method of our invention which is taught in this specification is one for treatment of exhaust gases. In particular, the method is one which treats exhaust gases which if left untreated can generate, upon full oxidation, temperatures in a range of from about 1600° F. to about 2700° F. Such exhaust gases generally are developed in medium weight, heavy duty trucks operated on gasoline powered internal combustion engines.

When these vehicles are operated at wide-open throttle, an air/fuel mixture is burned in the internal combustion engine which has an A/F ratio of 12-13 during maximum load conditions. When operating under such conditions, the exhaust gases generated by the engine have a temperature of about 1600° F. and contain 5-6 mole percent carbon monoxide as well as a very large amount of oxides of nitrogen. More oxides of nitrogen are developed generally at wide-open throttle conditions than at any other time during the operation of the engine. It is known that for complete oxidation of every mole percent of carbon monoxide, the gas stream containing that carbon monoxide will rise in temperature about 180° F. Thus, if the 5-6 mole percent of carbon monoxide is completely oxidized on an oxidizing catalyst, the exhaust gas temperature can reach a temperature approaching 2600°-2700° F., assuming no heat loss.

Such an extreme temperature is, of course, detrimental to not only the catalyst on the catalyst substrate, but also the catalyst substrate itself. Excessive temperatures tend to sinter the catalyst together in a manner in which it loses its catalytic activity because of a dramatic loss in surface area. Also, the excessive temperatures can act on the substrate material and, in extreme cases, can cause a melting thereof. Another problem that is encountered with excessive temperatures is that of spalling of the washcoat material from the substrate, the washcoat material being that material which supports the catalyst.

The method of our invention is preferably carried out in the following manner. An internal combustion engine 10 is operated under conditions in which there is insufficient oxygen to oxidize all the hydrocarbons present in the fuel being burned in the engine. In general, the engine is an internal combustion engine operating on gasoline as the fuel.

By operating at an air/fuel ratio which is oxygen deficient, the exhaust gases developed from the engine contain both unburned hydrocarbons and carbon monoxide derived from a partial burning of some of the fuel. The hydrocarbons contained in the exhaust gases are generally easier to oxidize directly to carbon dioxide and water vapor than is the carbon monoxide to oxidize to carbon dioxide.

The exhaust gases developed by burning the fuel in the engine are passed into an exhaust manifold 12 of the internal combustion engine 10. The exhaust gases then pass from the exhaust manifold 12 through an exhaust pipe 14 to an oxidation catalyst 16. The oxidation catalyst is based primarily on palladium metal as the oxidizing catalyst. Palladium metal is selected at the preferred material because palladium is substantially cheaper than other oxidizing catalysts such as platinum. Palladium has another advantage in that it is available in North America as a mined material. The palladium catalyst is prepared in a standard manner by placing finely divided palladium on a suitable substrate material. In this case, the substrate material is a monolithic or pelletized support. The preparation of the substrate and the placement of palladium thereon is well known in the art as is evidenced by the millions of motor vehicles presently on the road having catalyst substrates at least in part coated with palladium metal. In view of the fact that preparation of palladium-bearing catalyst substrates is well known in the art, no further discussion thereof will be undertaken herein.

After the exhaust gases pass over the oxidation catalyst 16, they are exhausted to the atmosphere through tailpipe 18. The exhaust gases passed to the atmosphere in accordance with the teachings of the method of our invention generally contain little, if any, hydrocarbons, fully oxidized reaction products of hydrocarbons with oxygen, that is, carbon dioxide and water vapor, and little, if any, oxides of nitrogen. During wide-open throttle conditions, as will be described hereinbelow, there is a slight amount of carbon monoxide passed to the atmosphere through tailpipe 18, but the amount is small and depends on the amount of oxygen in the exhaust gases. On balance, however, the oxides of nitrogen, which are generated in substantial amounts during wide-open throttle conditions, are completely reduced so that little, if any, oxides of nitrogen are passed to the atmosphere during such operating conditions. The oxides of nitrogen are in effect reduced to nitrogen as will be described hereinbelow.

An air pump 20 is associated with the internal combustion engine 10. This air pump draws in air through an air inlet system 22 and compresses the same for supply as will be described below. The air pump is designed so that at maximum it can generate only up to about 80% of the oxygen required to combust fully all of the hydrocarbons and carbon monoxide contained in the exhaust gases to carbon dioxide and water vapor when the internal combustion engine 10 is operating in a wide-open throttle condition. As stated above, when operating under such a wide-open throttle condition, the air/fuel ratio fed to the engine approaches 12-13. Thus, the air pump is designed so that even under this condition the air generated thereby would not be sufficient when added to the exhaust gases to bring the air/fuel ratio of the overall mixture to stoichiometric. In fact, the overall gas mixture would be slightly oxygen deficient under wide-open throttle conditions. Of course, under part load conditions, such as normal driving when maximum load conditions do not exist, the air/fuel ratio is close to stoichiometric air/fuel ratio of 14.7 to 1, and the air pump 20 has sufficient capacity to provide all the oxygen necessary to combust fully all of the hydrocarbons and carbon monoxide contained in the exhaust gases issuing from the internal combustion engine to carbon dioxide and water vapor. In a medium weight, heavy duty truck application, other than garbage trucks used within a city, it must be kept in mind that the greatest proportion of the drive cycle of the vehicle is spent either at normal cruise conditions or at wide-open throttle conditions.

A portion of the air from the air pump 20 is directed by means of air line 24 into the exhaust manifold 12. Thus, a portion of the air generated by the air pump 20 is fed to the exhaust manifold. In the exhaust manifold, because of the high exhaust temperatures, this air supply oxidizes any of the hydrocarbons not yet fully oxidized and also oxidizes a portion of the carbon monoxide contained in the exhaust gases. Thus, a portion of the heat generated by burning the carbon monoxide is generated in the exhaust manifold 12 of the engine.

As the higher temperature exhaust gases are exhausted from the exhaust manifold and passed through the exhaust pipe 14, the overall temperature of the exhaust gases has an opportunity to drop because the catalyst and exhaust manifold are generally spaced apart from one another in the motor vehicle. In normal applications the two are spaced anywhere from two to four feet apart from one another and thus the exhaust gases passing through the exhaust pipe have an opportunity to cool prior to passing over the oxidation catalyst.

A second air line 26 is connected to the exhaust pipe 14 just prior to the oxidation catalyst 16. The air line passes from the air pump 20 and provides a means for conveying a portion of the air compressed by the pump to the exhaust gases just prior to their passage over the catalyst material. As stated above, under wide-open throttle conditions, the air pump does not have sufficient capacity to supply all of the oxygen required for complete burning of the unburned hydrocarbons and carbon monoxide contained in the exhaust gases generated by the internal combustion engine.

Under wide-open throttle conditions, therefore, the exhaust gases with the air supplied thereto, both in the exhaust manifold and prior to the catalyst 16, still have an overall oxygen deficient condition and are reducing in nature. When these gases are passed over the catalyst at high temperatures, the catalyst is effective to use what oxygen is available in oxidizing the carbon monoxide to carbon dioxide and in catalyzing the reduction of the oxides of nitrogen in a reducing reaction and giving that oxygen to the carbon monoxide to oxide it to carbon dioxide. If there are any hydrocarbons left unburned, those hydrocarbons would also be oxidized to carbon dioxide and water vapor. However, under wide-open throttle conditions and by the time the exhaust gases reach the catalyst, the exhaust gases contain little, if any, unburned hydrocarbons Thus, under wide-open throttle conditions the exhaust gases being passed by the tailpipe 18 to the atmosphere contain little, if any, oxides of nitrogen, little, if any, unburned hydrocarbons, and a small proportion of carbon monoxide Since not all of the carbon monoxide is fully oxidized over the catalyst under wide-open throttle conditions, the maximum temperatures are not obtained on the catalyst. Generally, this system is designed so that about 1 to 3 mole percent of carbon monoxide passes through the catalyst without being oxidized.

In our preferred embodiment, about 80% of the capacity of the air pump is supplied by means of air line 24 to the exhaust manifold 12. The balance of 20% of the generated oxygen supply is supplied by air line 26 to the exhaust gases passing through exhaust pipe 14 just prior to its passage over the oxidation catalyst 16. However, the proportion may be changed.

When the internal combustion engine 10 is being operated at or near normal throttle conditions, the capacity of the air pump 20 is such that sufficient oxygen is provided to carry out all necessary oxidizing reactions. In this case, the exhaust gases passing over the oxidation catalyst have excess oxygen and are therefore net oxidizing in content. Under these conditions, the palladium catalyst is effective to convert any unburned hydrocarbons present to carbon dioxide and water vapor and oxidize any carbon monoxide present to carbon dioxide. The oxides of nitrogen produced during part throttle conditions in the internal combustion engine are very low. No reduction of the oxides of nitrogen occurs over the catalyst because of the net oxidizing nature of the exhaust gas stream. However, the exhaust to the tailpipe 18 is relatively free of unburned hydrocarbons and carbon monoxide and contains only a small amount of oxides of nitrogen. This condition, of course, is much preferred over a condition in which engine exhaust gases are not treated at all.

While particular embodiments of the invention have been illustrated and described, it will be obvious to those skilled in the art that various changes and modifications may be made to the method of our invention without departing from that invention. It is intended to cover in the appended claims all such modifications and equivalents as fall within the true spirit and scope of this invention.

We claim:

1. A method of treating exhaust gases from an engine variably operated at rich and at stoichioimetric air/fuel ratios, said exhaust gas flowing from said engine through an exhaust manifold and thence through an exhaust pipe containing an oxidation catalytic converter, said catalytic converter being effective to reduce CO, HC and $NO_x$ constituents of said exhaust gas, comprising: introducing secondary air to said exhaust gas, both at the exhaust manifold and at a location adjacent and upstream of said catalytic converter, said air being introduced in a predetermined controlled quantity effective (i) to create a reducing condition for said exhaust gas as it enters said catalyst during rich operating air/fuel ratios of said engine to oxidize 80–95 mole percent of CO while substantially oxidizing all $NO_x$ and HC, and (ii) to create, with said same predetermined quantity of air, an oxidizing condition for said exhaust gas as it enters said catalyst during substantially stoichiometric operating air/fuel ratios for said engine to oxidize substantially all CO and HC.

2. The method as in claim 1, in which rich operating air/fuel ratios are 12–13, and said substantially stoichiometric air/fuel ratios are at or about 14.7.

3. The method as in claim 1, in which about 80% of said secondary air is introduced at the exhaust manifold and the balance of said secondary air is introduced at said location adjacent and upstream of said catalyst converter.

4. The method as in claim 1, in which said predetermined quantity of secondary air is 1–3 mole percent of said exhaust gas.

* * * * *